United States Patent [19]
Willinger

[11] 3,776,195
[45] Dec. 4, 1973

[54] FEED-BOTTLE
[75] Inventor: Allan H. Willinger, New Rochelle, N.Y.
[73] Assignee: Metaframe Corporation, Maywood, N.J.
[22] Filed: June 28, 1972
[21] Appl. No.: 267,148

[52] U.S. Cl. .................................. 119/72.5, 119/18
[51] Int. Cl. ............................................ A01k 07/00
[58] Field of Search ........................... 119/72.5, 18; 215/1 C, 11 R

[56] References Cited
UNITED STATES PATENTS
3,122,127   2/1964   Shechmeister et al. ................ 119/18
3,529,575   9/1970   Schalk ............................... 119/72.5

Primary Examiner—Hugh R. Chamblee
Attorney—Abraham Friedman et al.

[57] ABSTRACT

A fluid feed-bottle for animals which is entirely elastomeric and includes a spout at the open end thereof which has an internal dimension of sufficiently small nature for resisting outflow of fluid therethrough when the feed-bottle is inverted.

15 Claims, 7 Drawing Figures

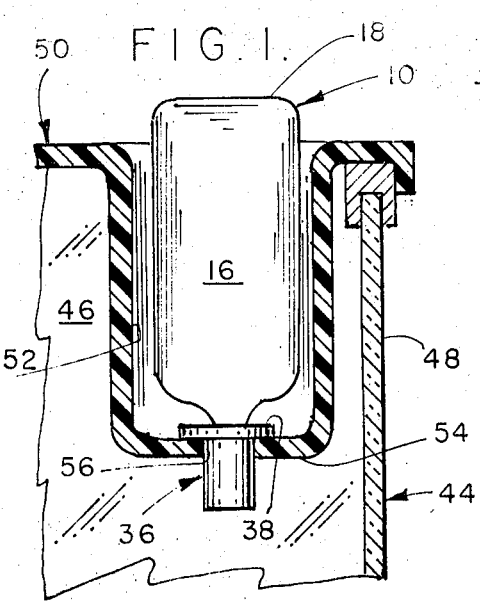
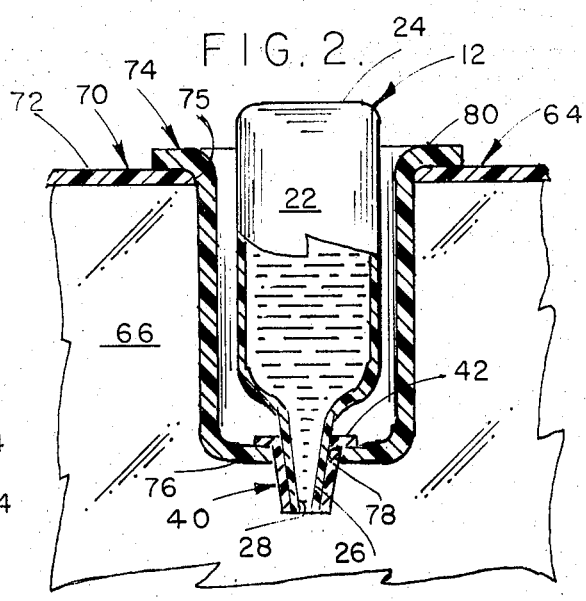
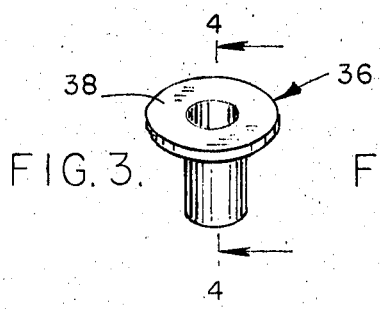
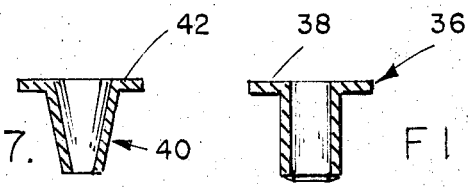
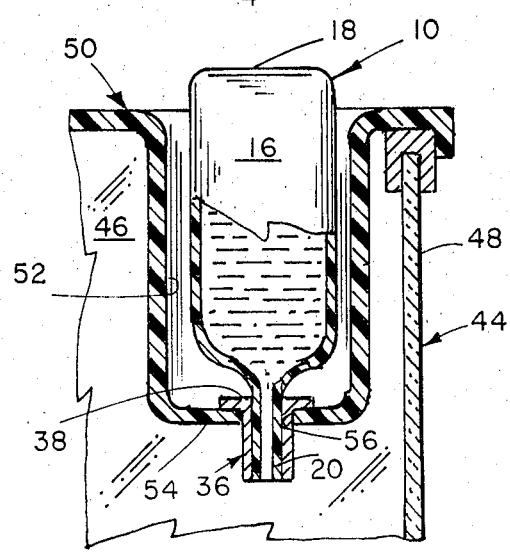
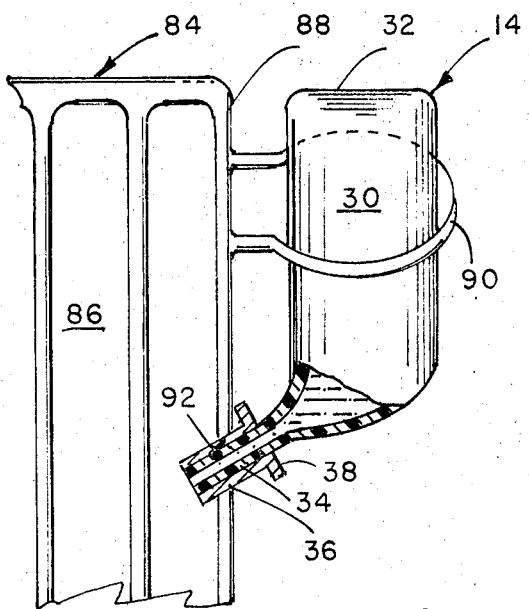

FEED-BOTTLE

BACKGROUND OF THE INVENTION

The present invention relates generally to accessories for animal habitats and the like which are utilized by hobbyists, and more particularly to a fluid feed-bottle which when inverted will resist outflow of fluid through an elongate spout at the open end thereof.

The traditional water bottle generally consists of a glass or plastic substance and is provided at its open end with a rubber stopper or screw cap having a hole therein through which extends a metal or plastic tube, in the nature of a straw or the like, the entire assembly being generally air tight other than that of the passageway extending through the tube or straw.

This type of structure, when inverted, will generally prevent water from dripping or otherwise flowing out of the bottle through the tube or straw, this because of the rather small diameter of the passageway in the tube or straw.

A drawback associated with this type of arrangement is that the rubber stopper or cap after a period tends to leak, thereby, obviating the air tight nature of the assembly and the effectiveness thereof. Moreover, the tube or straw as formed of glass, plastic or metal, is generally quite expensive in terms of being specifically manufactured for the bottle and is often is ineffective in terms of being too narrow, thereby, permitting air bubbles and the like to block the passageway and preventing the outflow of water when the tube is sucked upon or the like. Certainly, when the opening in the tube or straw is enlarged, it should be clear that the water will simply pour out when the bottle is inverted.

Another disadvantage associated with bottles of plastic nature is the fact that plastic, when placed in proximity with an animal such as a rodent or the like, will be gnawed upon by the rodent, thereby, destroying the bottle structure. This is especially significant when the plastic is extremely flexible or is of elastomeric nature so as to permit squeezing of the wall thereof during the course of filling the bottle, this while the open end of the bottle is submerged in water or other fluid-feed substance, the wall when released returning to an at-rest configuration or condition, thereby, drawing water through the open end and into the confines of the bottle.

SUMMARY OF THE INVENTION

Accordingly, it is an object of the present invention to provide an air-tight bottle having an open end which permits the bottle to be inverted and will resist the outflow of the liquid or fluid-feed substance within the bottle.

It is another object of the present invention to provide a fluid feed-bottle which when inverted and placed in proximity with a rodent may be sucked upon in a manner as one utilizes a straw, this being effected through the intermediary of an elongate spout formed as part of the open end of the bottle.

It is another object of the present invention to provide a protective spout-sleeve for surrounding the spout, the spout-sleeve being constituted of metal or the like so as to be gnaw resistant and provide protection for the bottle spout.

It is still a further object of the present invention to provide a lid or cover assembly for an animal enclosure, the cover assembly having structure associated with the fluid feed-bottle so as to maintain the feed-bottle in an inverted condition in proximity with a rodent confined within the enclosure so as to permit the rodent to suck upon the elongate spout of the feed-bottle.

To this end, the present invention relates generally to a fluid feed-bottle for animals, the feed-bottle comprising an elastomeric wall terminating in a pair of end portions, one of the end portions being closed, the other of the end portions being open, the open end portion including an elongate spout integral with said elastomeric wall, the spout having an internal diameter less than the lateral dimension of said elastomeric wall, the internal diameter of said spout being sufficiently small for resisting outflow of fliud therethrough when the feed-bottle is inverted.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a fragmentary cross-sectional view of an enclosure within which a rodent may be confined and illustrating the manner by which one embodiment of the fluid feed-bottle is associated therewith;

FIG. 2 is a view similar to that of FIG. 1, but illustrating a second embodiment of both the enclosure and the fluid feed-bottle pursuant to the present invention;

FIG. 3 is an enlarged perspective view of the protective spout-sleeve for that of the feed-bottle illustrated in FIG. 1;

FIG. 4 is a cross-sectional view taken along the line 4—4 in FIG. 3;

FIG. 5 is a view similar to that of FIG. 1, illustrating in cross-section the embodiment of the fluid feed-bottle illustrated in FIG. 1;

FIG. 6 is a fragmentary partially cross-sectional view of a further embodiment of the fluid feed-bottle pursuant to the present invention and a further embodiment of the manner by which the feed-bottle is to be associated with an animal enclosure; and FIG. 7 is an elevational cross-sectional view of the protective spout-sleeve for the embodiment of the fluid feed-bottle illustrated in FIG. 2.

DETAILED DESCRIPTION OF THE INVENTION

Referring now to the drawings, and more particularly to FIGS. 1 and 5, there is illustrated a first embodiment pursuant to the present invention of the fluid feed-bottle and denoted generally by the reference character 10. A second embodiment of the fluid feed-bottle pursuant to the present invention is illustrated in FIG. 2 and denoted generally by the reference character 12. Still a third embodiment of the fluid feed-bottle pursuant to the present invention is illustrated in FIG. 6 and is denoted by the reference character 14.

The fluid feed-bottle, pursuant to the first embodiment and denoted by the reference character 10, includes an elastomeric wall 16 which is preferably constituted of transparent or translucent polyethylene or the like, the elastomeric wall being generally cylindrical in nature and terminates in a closed end portion 18 and an open end portion formed as an elongate cylindrical spout 20.

The fluid feed-bottle 12 is, likewise, provided with an elastomeric cylindrical wall 22 which terminates in a closed end portion 24 opposite which is coaxially aligned, in generally concentric relation, an open end formed as an elongate spout 26 which is of frusto-conical nature, the spout 26 terminating in an opening 28 of minimum dimension, the term "minimum dimension" referring to the fact that the opening 28 has a lesser diameter than the opening of the spout 26 most proximate the elastomeric wall 22.

The fluid feed-bottle 14 is similarly provided with an elastomeric wall 30 (FIG. 6), the elastomeric wall 30 terminating in a closed end portion 32 and in an open portion formed as a spout 34 which is of cylindrical nature. However, the spout 34 pursuant to the embodiment of the fluid feed-bottle 14 is offset out of concentric or coaxial alignment with the closed end portion 32 and is provided with an axis which is generally inclined relative to the axis of the elastomeric wall 30, the latter wall being generally cylindrical likewise.

Each and every one of the embodiments 10, 12 and 14 functions in a very similar manner in that the elastomeric walls can be readily squeezed and released so as to permit filling of the bottle interior with a fluid, this when the respective spouts of the feed-bottles are submerged within the fluid with which the feed-bottles are to be filled. Moreover, the cylindrical passageway of the spout 20 for the feed bottle 10, the cylindrical passageway in the spout 34 of the embodiment 14, and the opening 28 of minimum dimension at the end of the spout 26 of the embodiment 12 are provided with respective diameters which are sufficiently small for resisting outflow or dripping of fluid confined within the feed-bottles when the feed-bottles are inverted such that their respective spouts extend downwardly.

Each of the fluid feed-bottles pursuant to the embodiments 10, 12 and 14 may be destroyed by gnawing when placed in proximity to a rodent or the like and, thus, the present invention contemplates the utilization of a gnaw resistant protective spout-sleeve, such as the spout-sleeve denoted by reference character 36 in FIGS. 1, 3, 4, 5 and 6, the spout-sleeve 36 being generally cylindrical in nature so as to conform internally with the external contour of the cylindrical spouts 20 and 36 of the embodiments 10 and 14 respectively, the spout-sleeve 36 being open at both of its ends, one of the ends having a transverse annular flange 38 thereupon for purposes as will be clarified below.

Similarly, the feed-bottle 12, which is provided with a generally frusto-conical spout 26, may be protected through the intermediary of a generally frusto-conical spout-sleeve 40 as illustrated in FIG. 7, the spout-sleeve 40 having a transverse annular flange 42 likewise for purposes as will be clarified below.

In this respect, as illustrated preferably in FIGS. 1 and 5, a rodent or the like may be confined within a habitat enclosure denoted by the reference character 44, only a fragment of the enclosure 44 being illustrated in FIGS. 1 and 5, the enclosure 44 having a front wall 46 and a side wall 48 illustrated in part in FIGS. 1 and 5, the rear wall, bottom and opposite side wall not being shown herein. Moreover, the enclosure 44 is provided with a cover assembly 50 which is integrally provided with what may be characterized as a tubular receptacle 52 having a bottom portion 54 in which is formed an aperture 56. The tubular receptacle 52 corresponds in contour and depth to the external contour and length of the elastomeric wall 16 of the feed-bottle 10 and, thus, permits detachable insertion of the feed-bottle 10 into the confines of the interior of the tubular receptacle 52 such that the spout 20 and a portion of the gnaw-resistant protective spout-sleeve 36 protrude through the aperture 56 formed in the bottom portion 54 of the receptacle 52, the transverse annular flange 38 of the spout-sleeve 36 resting freely upon and surrounding the upper or external periphery of the aperture 56.

Accordingly, the spout-sleeve 36 and spout 20 of the feed-bottle 10 extend in close proximity with, and are accessible to, a rodent who may suck upon the spout 20 to withdraw water or other fluid feed substance confined within the bottle 10, the spout-sleeve 36 which is of metallic nature generally preventing the rodent from gnawing upon the spout 20 and thereby destroying the spout structure. Moreover, because of the nature of the rather small diameter of the interior of the spout 20, the fluid confined within the feed-bottle 10 will be prevented from dripping outwardly therefrom when the bottle 10 is in an inverted condition as illustrated in FIGS. 1 and 5.

Similarly, the fluid feed-bottle 12 as illustrated in FIG. 2 may be likewise maintained in an inverted condition proximate a rodent to permit the rodent to suck upon the spout 26 thereof for purposes of withdrawing, at will, fluid feed substance confined within the bottle 12. In this respect, an alternate embodiment of the enclosure of the present invention is illustrated in FIG. 2 and denoted generally by the reference character 64. The enclosure 64 is likewise provided with a front wall 66, the side walls and bottom of the enclosure 64 being omitted from illustration herein. The enclosure 64 however is provided with a cover assembly 70 which is constituted generally of two segments, one of which may be characterized herein as a support portion 72 and the other of which may be characterized as a tubular receptacle 74 detachably associated with the support portion 72.

In this respect, the support portion 72 is provided with an enlarged opening 75 through which is insertable the receptacle 74. The tubular receptacle 74 is provided with a bottom 76 in which is formed an aperture 78, and an upper open portion externally of which extends a transverse annular shoulder 80 for resting freely upon and surrounding the external or upper periphery of the enlarged opening 75. Thus, the tubular receptacle 74 may be withdrawn from the confines of the enclosure 64 simply by lifting the annular shoulder 80 of the receptacle 74 from the confines of the support portion 72 of the cover assembly 70.

Although the embodiment of the cover assembly 70, illustrated in FIG. 2, differs from that of the cover assembly 50, illustrated in FIGS. 1 and 5, in principal and concept each permits the utilization of the fluid feed-bottles pursuant to the embodiments 10 and 12 aforementioned.

In this respect, although the fluid feed-bottle 12 is illustrated as resting upon the bottom 76 of the tubular receptacle 74 in FIG. 2, it should be clear, that the fluid feed-bottle 10 may likewise be inserted into the receptacle 74, this because of the relationship of the spout 20 of the embodiment 10 with that of the spout 26 of the embodiment 12 in that each differs from one another only in terms of configuration, the spout 20 being generally cylindrical, whereas the spout 26 is generally frusto-conical. Each of the embodiments utilizes a protective spout sleeve, the spout sleeves having a respective transverse annular flange for resting upon and surrounding the periphery of the apertures provided at the bottom of the tubular receptacles aforementioned.

Still another embodiment of the enclosure in which an animal or rodent may be confined is illustrated partially in FIG. 6. In this respect, the enclosure is denoted generally by the reference character 84 and is provided with a front wall 86 and a side wall 88 (top and bottom portions and an opposite side wall not being illustrated herein).

Pursuant to the embodiment of FIG. 6, the enclosure 84 is externally provided with a ring bracket 90 formed or extending from the side wall 88 so as to confine or otherwise support the fluid feed-bottle 14 in an inverted condition, the side wall 88 likewise having an aperture 92 through which both the spout 34 and protective spout-sleeve 36 protrude into the confines of the enclosure 84 in proximity with a rodent who may, thereby, suck upon and withdraw fluid feed substance within the bottle 14.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A fluid feed-bottle for animals in combination with a detachable gnaw-resistant protective spout-sleeve, said feed-bottle comprising an elastomeric wall terminating in a pair of end portions, one of said end portions being closed, the other of said end portions being open, the open end portion including an elongate spout integral with said elastomeric wall, said spout having an internal diameter less than lateral dimension of said elastomeric wall, the internal diameter of said spout being sufficiently small for resisting outflow of fluid therethrough when the feed-bottle is inverted, said spout-sleeve including a pair of coaxially opposite open end portions and an internal contour conforming generally to external contour of said spout.

2. A fluid feed-bottle as claimed in claim 1, wherein the entire feed-bottle, including said spout, is elastomeric.

3. A fluid feed-bottle as claimed in claim 2, wherein the entire feed-bottle, including said spout, is a one-piece unit and constituted of polyethylene.

4. A fluid feed-bottle as claimed in claim 3, wherein said spout is cylindrical and is concentrically aligned coaxially opposite the closed end portion.

5. A fluid feed-bottle as claimed in claim 3, wherein said spout is generally frusto-conical and terminates in a free end of minimum dimension which is concentrically aligned coaxially opposite the closed end portion.

6. A fluid feed-bottle as claimed in claim 3, wherein said spout is cylindrical and is offset out of concentric alignment with the closed end portion.

7. A fluid feed-bottle as claimed in claim 3, wherein said spout is generally frusto-conical and terminates in a free end of minimum dimension which is offset out of concentric alignment with the closed end portion.

8. A fluid feed-bottle as claimed in claim 6, wherein said spout and elastomeric wall have respective axes inclined relative to one another.

9. A fluid feed-bottle as claimed in claim 7, wherein said spout and elastomeric wall have respective axes inclined relative to one another.

10. A fluid feed-bottle as claimed in claim 1, wherein said spout-sleeve includes a transverse annular flange at one open end portion thereof.

11. A fluid feed-bottle as claimed in claim 10, wherein said spout-sleeve is metallic.

12. A fluid feed-bottle as claimed in claim 10, in further combination with an enclosure for confining an animal, the enclosure including a cover assembly having an aperture formed therein through which both said spout and spout-sleeve detachably project such that said transverse annular flange of said spout-sleeve rests upon and surrounds the external periphery of said aperture.

13. A fluid feed-bottle as claimed in claim 12, wherein said cover assembly is provided with a tubular receptacle internally conforming in contour and depth to the external contour and length of said elastomeric wall of the feed-bottle, said tubular receptacle terminating in a bottom portion in which is formed said aperture.

14. A fluid feed-bottle as claimed in claim 13, wherein said tubular receptacle is detachably associated with said cover, said tubular receptacle including an open top portion from which transversely extends an annular shoulder, said cover assembly having an enlarged opening through which said tubular receptacle is insertable such that the annular shoulder of said receptacle rests upon and surrounds the external periphery of said enlarged opening.

15. A fluid feed-bottle as claimed in claim 10, in further combination with an enclosure for confining an animal, the enclosure including a wall in which is formed an aperture through which both said spout and spout sleeve detachably project, said wall of the enclosure including means for detachably confining said elastomeric wall of said feed-bottle such that the latter is inverted and said spout and spout-sleeve project through said aperture into said enclosure.

* * * * *